(12) United States Patent
Horikawa et al.

(10) Patent No.: US 11,493,087 B2
(45) Date of Patent: Nov. 8, 2022

(54) STRUT BEARING AND VEHICLE STRUT SUSPENSION

(71) Applicant: NAKANISHI METAL WORKS CO., LTD., Osaka (JP)

(72) Inventors: Yoshio Horikawa, Osaka (JP); Yasuhiro Narazaki, Osaka (JP); Kohei Shibata, Osaka (JP)

(73) Assignee: NAKANISHI METALWORKS CO., LTD., Osaka (JP)

( * ) Notice: Subject to any disclaimer, the term of this patent is extended or adjusted under 35 U.S.C. 154(b) by 0 days.

(21) Appl. No.: 17/455,997

(22) Filed: Nov. 22, 2021

(65) Prior Publication Data

US 2022/0170510 A1 Jun. 2, 2022

(30) Foreign Application Priority Data

Dec. 2, 2020 (JP) .............................. JP2020-200442

(51) Int. Cl.
| | |
|---|---|
| *B60G 15/04* | (2006.01) |
| *F16C 35/067* | (2006.01) |
| *F16C 33/58* | (2006.01) |
| *B60G 15/06* | (2006.01) |
| *F16C 19/16* | (2006.01) |

(52) U.S. Cl.
CPC ............ *F16C 33/585* (2013.01); *B60G 15/04* (2013.01); *B60G 15/068* (2013.01); *F16C 19/163* (2013.01); *F16C 35/067* (2013.01); *F16C 2220/84* (2013.01); *F16C 2326/05* (2013.01)

(58) Field of Classification Search
CPC ........ F16C 19/10; F16C 19/14; F16C 19/163; F16C 33/585; F16C 35/04; F16C 35/042; F16C 35/067; F16C 2220/84; F16C 2326/05; B60G 15/04; B60G 15/068
See application file for complete search history.

(56) References Cited

U.S. PATENT DOCUMENTS

| | | | |
|---|---|---|---|
| 8,496,383 B2 | 7/2013 | Viault et al. | |
| 10,723,194 B2* | 7/2020 | Montboeuf | .......... B60G 15/068 |
| 11,167,613 B2* | 11/2021 | Blanchard | ............. F16C 33/583 |
| 2018/0372152 A1* | 12/2018 | Gaultier | ............. F16C 33/3887 |

FOREIGN PATENT DOCUMENTS

| | | | | |
|---|---|---|---|---|
| EP | 1445129 A1 * | 8/2004 | .......... | B60G 15/068 |
| FR | 2865008 A1 * | 7/2005 | ............. | B60G 11/16 |
| FR | 2937587 A1 * | 4/2010 | .......... | B60G 15/068 |
| JP | 4434768 B2 | 3/2010 | | |

* cited by examiner

*Primary Examiner* — Phillip A Johnson
(74) *Attorney, Agent, or Firm* — Innovation Capital Law Group, LLP; Vic Lin (57) ABSTRACT

An upper raceway ring has an inward flange portion. A lower raceway ring has an outward flange portion. An upper case has an outwardly projecting piece projecting in the radially outward direction toward an end surface of the inward flange portion from a surface facing the end surface. A lower case has an inwardly projecting piece projecting in the radially inward direction toward an end surface of the outward flange portion from a surface facing the end surface. The end surface of the upper raceway ring comes into contact with the outwardly projecting piece of the upper case, to allow the upper raceway ring to be held by the upper case. The end surface of the lower raceway ring comes into contact with the inwardly projecting piece of the lower case, to allow the lower raceway ring to be held by the lower case.

6 Claims, 6 Drawing Sheets

STRUT BEARING AND VEHICLE STRUT SUSPENSION

FIELD

The present invention relates to a strut bearing for use in a vehicle strut suspension.

BACKGROUND

As a suspension supporting a wheel on the body of a vehicle by means of a coil spring and including a shock absorber for absorbing vertical vibrations, there is a strut suspension in which an extendable strut containing a shock absorber is fixed to an axle. The strut suspension is widely used mainly for a front wheel of an automobile.

As a strut bearing for use in an upper portion of the strut suspension, there is a strut bearing including an upper case and a lower case which are made of a synthetic resin. The upper case comes into contact with an upper raceway ring so as to hold it, and the lower case comes into contact with a lower raceway ring so as to hold it (e.g., see Patent Literatures 1 and 2).

CITATION LIST

Patent Literature

Patent Literature 1: U.S. Pat. No. 8,496,383
Patent Literature 2: Japanese Patent No. 4434768

SUMMARY

Technical Problem

In the strut bearing according to Patent Literature 1, a body part (a cylindrical surface) of an upper raceway ring 7 is fitted to a surface of an upper case 4, which is parallel to the axial direction, so that the upper case 4 holds the upper raceway ring 7. Similarly, a body part (a cylindrical surface) of a lower raceway ring 8 is fitted to a radially inward surface of a lower case 11, so that the lower case 11 holds the lower raceway ring 8.

As described above, the strut bearing according to Patent Literature 1 includes the body parts. Accordingly, the height in each of the upper raceway ring 7 and the lower raceway ring 8 increases. Such thick raceway rings may cause a problem including deteriorated machining accuracy, and so on. When a steel plate is subjected to press working to manufacture a raceway ring, for example, deep drawing is required. Accordingly, the accuracy in a concave-shaped curved surface in which a rolling element rolls may deteriorate, the thickness of a plate may decrease, and such a problem may occur.

In a strut bearing according to Patent Literature 2, a raceway ring is not provided with such a body portion, so that the height of an upper raceway ring 13 and a lower raceway ring 14 does not increase. Accordingly, the problems described above may not occur.

However, in the strut bearing according to Patent Literature 2, the upper raceway ring 13 is not fitted to an upper case 18, and the lower raceway ring 14 is not fitted to a lower case 12. This configuration reduces the adhesiveness between the upper case made of the synthetic resin and the upper raceway ring made of metal, and the adhesiveness between the lower case made of the synthetic resin and the lower raceway ring made of the metal.

In a strut bearing, the difference in dimensions of components and the variation in an inputted load may cause the eccentricity to be generated between the upper case and the lower case. Accordingly, it is necessary for the position relation between the components to be measured and controlled, for preventing the upper case and the lower case from interfering with each other even in a case when the eccentricity occurs. The eccentricity that needs to be controlled includes eccentricity occurring between each of the raceway rings and the corresponding case after the strut bearing is assembled, for example.

However, in the configuration of the strut bearing according to Patent Literature 2, the upper raceway ring 13 is not fitted to the upper case 18, and the lower raceway ring 14 is not fitted to the lower case 12. In such a condition, when the position relation between the upper case 18 made of the synthetic resin and the upper raceway ring 13 made of the metal is measured, and when the position relation between the lower case 12 made of the synthetic resin and the lower raceway ring 14 made of the metal is measured, displacement in positions of each of the cases and the corresponding raceway ring occurs due to a measurement pressure. Thus, the position relation in the strut bearing cannot be measured under a state of subassembly in which the cases are respectively combined with the raceway rings. This lowers the quality control performance.

An object of the present invention is to provide a strut bearing provided with an upper case and a lower case which are made of a synthetic resin, the strut bearing being able to improve the adhesiveness between the case made of a synthetic resin and a raceway ring made of metal, and to improve the quality control performance in position relation between the synthetic resin case and the metal raceway ring without increasing the height of the raceway ring.

Solution to Problem

The substance of the present invention is as follows.
1:
A strut bearing including: an upper case fixed to an upper end portion of a strut in a vehicle strut suspension; a lower case directly or indirectly connected to a coil spring disposed on an outer side of the strut; an upper raceway ring being in contact with the upper case to be positioned; a lower raceway ring being in contact with the lower case to be positioned; and a rolling element rolling between the upper raceway ring and the lower raceway ring, in which the upper case and the lower case are made of a synthetic resin, the upper raceway ring has an inward flange portion projecting in a radially inward direction, the lower raceway ring has an outward flange portion projecting in a radially outward direction, the upper case has an outwardly projecting piece projecting in the radially outward direction toward an end surface of the inward flange portion of the upper raceway ring, from a surface facing the end surface of the inward flange portion, the lower case has an inwardly projecting piece projecting in the radially inward direction toward an end surface of the outward flange portion of the lower raceway ring, from a surface facing the end surface of the outward flange portion, the end surface of the inward flange portion of the upper raceway ring comes into contact with the outwardly projecting piece of the upper case, to allow the upper raceway ring to be held by the upper case, and the end surface of the outward flange portion of the lower raceway ring comes into contact with the inwardly projecting piece of the lower case, to allow the lower raceway ring to be held by the lower case.

2:

A strut bearing including: an upper case fixed to an upper end portion of a strut in a vehicle strut suspension; a lower case directly or indirectly connected to a coil spring disposed on an outer side of the strut; an upper raceway ring being in contact with the upper case to be positioned; a lower raceway ring being in contact with the lower case to be positioned; and a rolling element rolling between the upper raceway ring and the lower raceway ring, in which the upper case and the lower case are made of a synthetic resin, the upper raceway ring has an outward flange portion projecting in a radially outward direction, the lower raceway ring has an inward flange portion projecting in a radially inward direction, the upper case has an inwardly projecting piece projecting in the radially inward direction toward an end surface of the outward flange portion of the upper raceway ring from a surface facing the end surface of the outward flange portion, the lower case has an outwardly projecting piece projecting in the radially outward direction toward an end surface of the inward flange portion of the lower raceway ring from a surface facing the end surface of the inward flange portion, the end surface of the outward flange portion of the upper raceway ring comes into contact with the inwardly projecting piece of the upper case, to allow the upper raceway ring to be held by the upper case, and the end surface of the inward flange portion of the lower raceway ring comes into contact with the outwardly projecting piece of the lower case, to allow the lower raceway ring to be held by the lower case.

3:

The strut bearing according to the above 1 or 2, in which the end surface of the inward flange portion of the upper raceway ring and the end surface of the outward flange portion of the upper raceway ring, and the end surface of the outward flange portion of the lower raceway ring and the end surface of the inward flange portion of the lower raceway ring are shear planes made through punching.

4:

A vehicle strut suspension provided with the strut bearing according to any one of the above 1 to 3.

Advantageous Effects

In the strut bearing and the vehicle strut suspension according to the present invention, the end surface of the inward flange portion of the upper raceway ring and the end surface of the outward flange portion of the upper raceway ring respectively come into contact with the outwardly projecting piece of the upper case and the inwardly projecting piece of the upper case, to allow the upper raceway ring to be held by the upper case. In addition, the end surface of the outward flange portion of the lower raceway ring and the end surface of the inward flange portion of the lower raceway ring respectively come into contact with the inwardly projecting piece of the lower case and the outwardly projecting piece of the lower case, to allow the lower raceway ring to be held by the lower case.

In the configuration of Patent Literature 1, a body portion is provided in the upper raceway ring to be held by the upper case, and a body portion is provided in the lower raceway ring to be held by the lower case. In comparison with such configuration, the strut bearing according to the present invention can reduce the height of the upper raceway ring and the lower raceway ring. Therefore, problems including the deterioration in machining accuracy in the upper raceway ring and the lower raceway ring can be resolved. In Patent Literature 2, the case made of a synthetic resin and the raceway ring made of metal are not fitted to each other. In comparison with such configuration, in the present invention, the raceway rings are fitted to the respective corresponding cases, enabling a subassembly with two components only. Under such a condition, the measurement of the position relation in the strut bearing is enabled. Therefore, the quality control performance of the strut bearing can be improved.

DESCRIPTION OF EMBODIMENT(S)

Embodiments of the present invention are described hereinafter with reference to the accompanied drawings.

Figure 1:
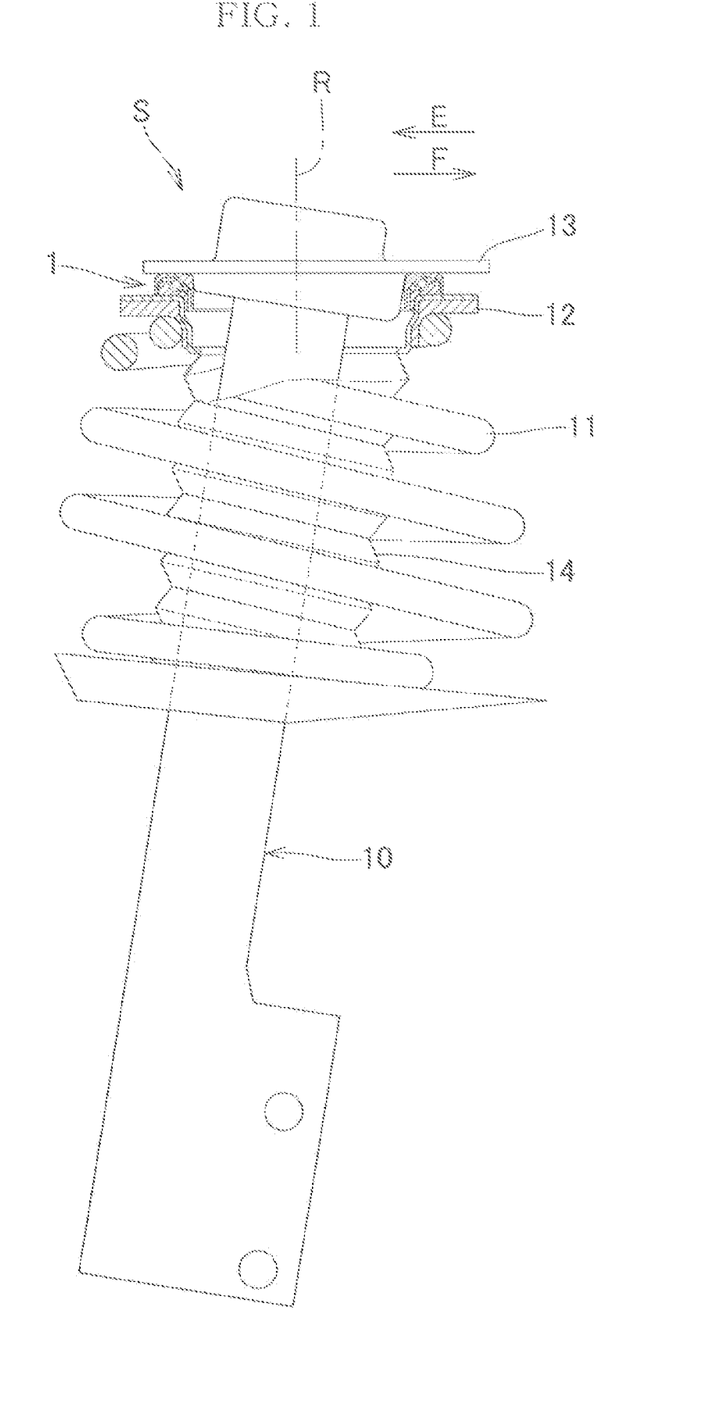
FIG. 1 is a schematic view with a partially cross-sectional view, showing a vehicle strut suspension provided with a strut bearing, according to an embodiment of the present invention.

In the description, the direction of a rotation axis R of a strut bearing 1 (see FIG. 1) is referred to as an "axial direction", a direction orthogonal to the axial direction and extending approaching the rotation axis R is referred to as a "radially inward direction" (see the direction indicated by an arrow E in FIG. 1, for example), and a direction orthogonal to the axial direction and extending away from the rotation axis R is referred to as a "radially outward direction" (see the direction indicated by an arrow F in FIG. 1, for example). When the axial direction is referred to as a vertical direction, a horizontal direction orthogonal to a radial direction around the rotation axis R is referred to as a "circumferential direction".

<Strut Suspension>

A vehicle strut suspension S shown in the schematic view of FIG. 1 is used in a state where an extendable strut 10 containing a shock absorber is fixed to an axle (not shown) and an upper mount 13 is fixed to the body of a vehicle.

An upper portion of the strut suspension S is provided with a strut bearing 1 that is swingably rotated in proportion to a change in the direction of a steering wheel due to steering operation, while supporting the vehicle body. The swing angle of the strut bearing 1 is defined so as to correspond to an allowable steering angle of the wheel, and is set in a range of 40° or more and 50° or less, for example.

A coil spring 11 that is a suspension spring, and a dust boot 14 for protecting an oil seal of the shock absorber from foreign substances such as sand are provided on the outer side of the strut 10. The strut suspension S includes a spring insulator 12 formed of an elastic body such as rubber on a support surface, of a lower case 3 (FIG. 2A), which supports the coil spring 11.

<Strut Bearing>

Figure 2A:
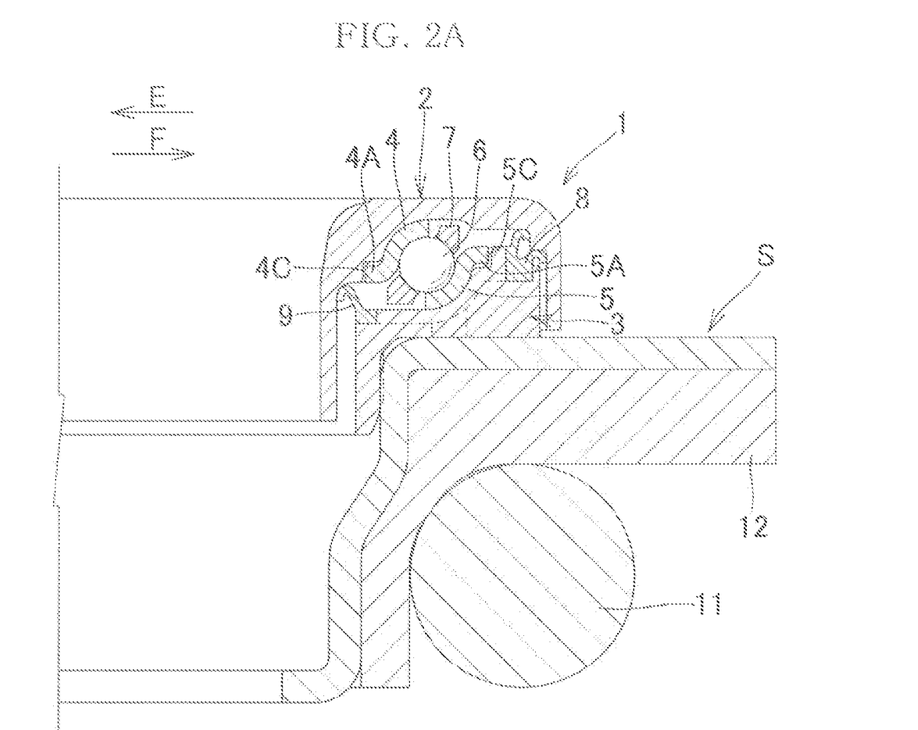
FIG. 2A is an enlarged vertical cross-sectional view of a main part of the strut suspension.
Figure 2B:
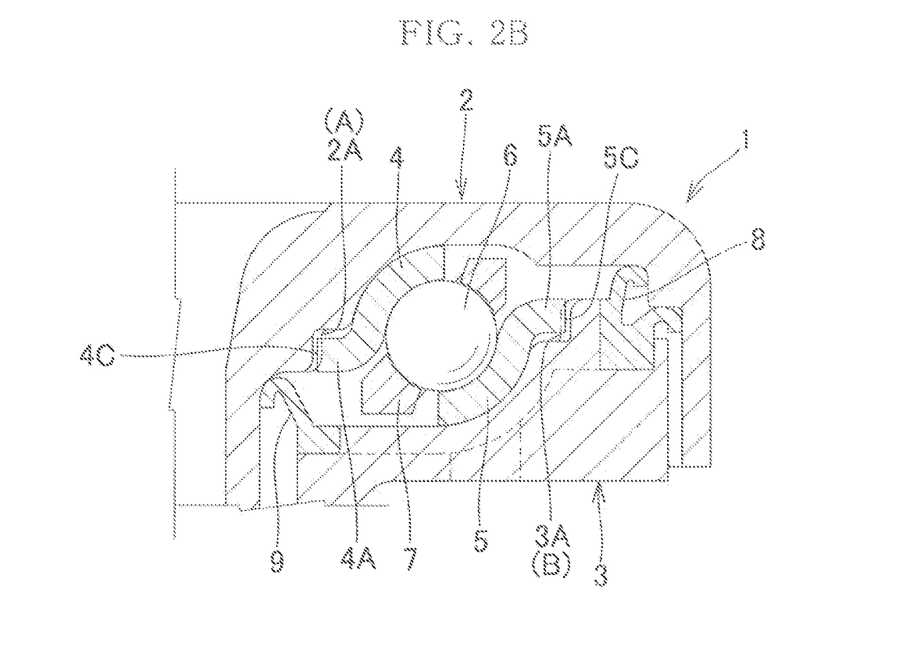
FIG. 2B is an enlarged vertical cross-sectional view of the main part of the strut bearing shown in FIG. 2A.

As shown in the schematic view of FIG. 1 and the vertical cross-sectional views of FIGS. 2A and 2B, the strut bearing 1 includes an upper case 2 fixed to an upper end portion of the strut 10, a lower case 3 indirectly connected to a coil spring 11 via the spring insulator 12 or directly connected thereto, an upper raceway ring 4 held by the upper case 2, a lower raceway ring 5 held by the lower case 3, and rolling elements 6 that roll between the upper raceway ring 4 and the lower raceway ring 5. The rolling elements 6 are held by a retainer 7 so that the adjacent rolling elements 6 do not come into contact with each other. The lower case 3 is provided with an outer-diameter side sealing member 8 and an inner-diameter side sealing member 9.

The upper raceway ring 4 and the lower raceway ring 5 are made of steel, and is formed by performing press working on a steel plate, followed by being subjected to quenching to be hardened. The upper case 2 and the lower case 3 are made of a synthetic resin. The lower case 3 is provided with the outer-diameter side sealing member 8 and the inner-diameter side sealing member 9, which are made of an elastomer.

The synthetic resin for forming the upper case 2 and the lower case 3 is polyamide (PA66, PA46, PA612, PA6, PA9T, PA10T, and so on) and contains 20 to 60% by weight of glass fiber (GF) as reinforced fiber, for example.

Examples of the above-described elastomer forming the outer-diameter side sealing member 8 and the inner-diameter side sealing member 9 include: TPS (styrene-based elastomer), TPO (olefin-based elastomer), TPU (urethane-based elastomer), TPA (amide-based elastomer), and TPEE (ester-based elastomer) as thermoplastic elastomers (TPE); and nitrile rubber (NBR), hydrogenated nitrile rubber (HNBR), acrylic rubber (ACM), ethylene-acrylic rubber (AEM), fluorine rubber (FKM, FPM), and silicone rubber (VQM) as rubber materials. One of the rubber materials may be used, or two or more of the rubber materials may be appropriately blended and used.

<Upper Raceway Ring and Lower Raceway Ring>

As shown in the vertical cross-sectional views of FIGS. 2A and 2B, the upper raceway ring 4 has an inward flange portion 4A projecting in a radially inward direction E, and the lower raceway ring 5 has an outer flange portion 5A projecting in a radially outward direction F.

<Upper Case>

Figure 3A:
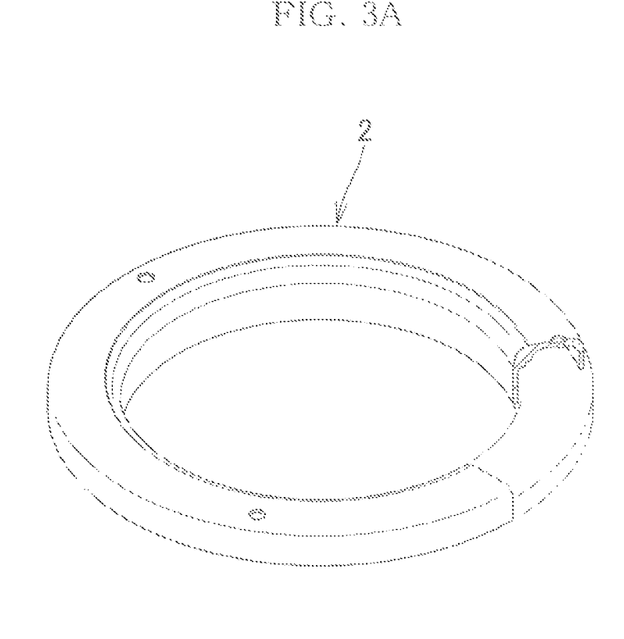
FIG. 3A is a perspective view with a partially vertical cross-sectional view, showing an upper case seen from the above.
Figure 3B:
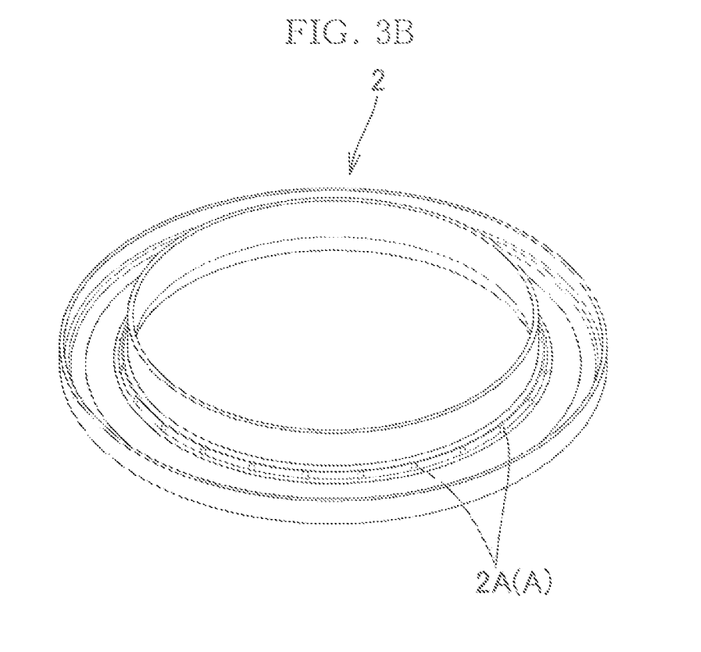
FIG. 3B is a perspective view of the vertically inversed upper case of FIG. 3A.

As shown in the vertical cross-sectional view of FIG. 2B, and the perspective views of FIGS. 3A and 3B, the upper case 2 has outwardly projecting pieces 2A projecting in the radially outward direction F toward an end surface 4C of the inward flange portion 4A of the upper raceway ring 4 from a surface facing the end surface 4C. Here, the outwardly projecting pieces 2A are aligned with a space in the circumferential direction, which define an outwardly projecting piece row A. The "outwardly projecting pieces" may not be required to form the outwardly projecting piece row A. In other words, the "outwardly projecting pieces" may have an uninterrupted shape, e.g., a protruding strip shape, for example.

<Lower Case>

Figure 4A:
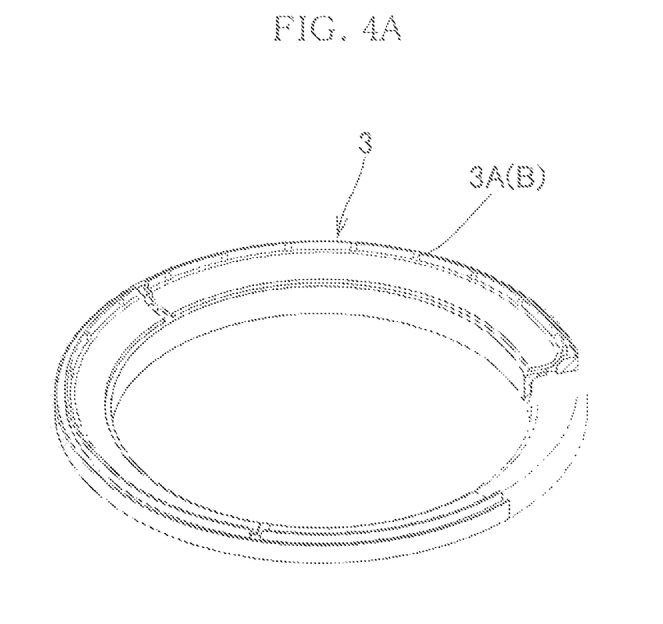
FIG. 4A is a perspective view with a partially vertical cross-sectional view, showing a lower case seen from the above.
Figure 4B:
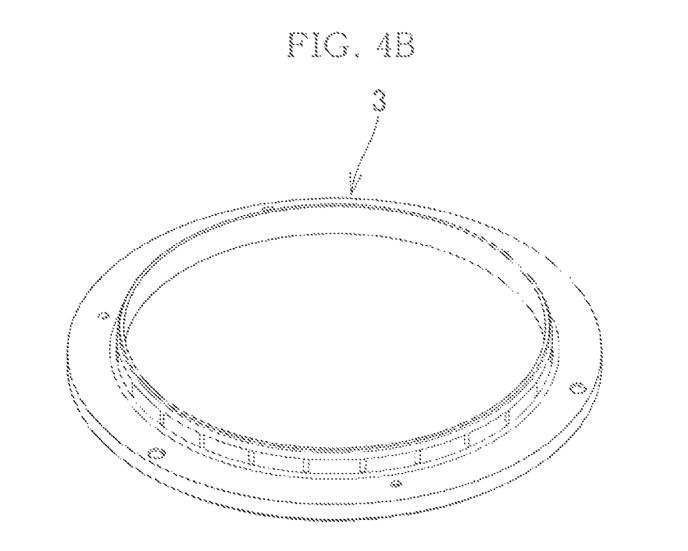
FIG. 4B is a perspective view of the vertically inversed lower case of FIG. 4A.

As shown in the vertical cross-sectional view of FIG. 2B, and the perspective views of FIGS. 4A and 4B, the lower case 3 has inwardly projecting pieces 3A projecting in the radially inward direction E toward an end surface 5C of the outward flange portion 5A of the lower raceway ring 5 from a surface facing the end surface 5C. Here, the inwardly projecting pieces 3A are aligned with a space in the circumferential direction, which define an inwardly projecting piece row B. The "inwardly projecting pieces" may not be required to form the inwardly projecting piece row B. In other words, the "inwardly projecting pieces" may have an uninterrupted shape, e.g., a protruding strip shape, for example.

<Holding of Upper Raceway Ring by Upper Case and Holding of Lower Raceway Ring by Lower Case>

The end surface 4C of the inward flange portion 4A of the upper raceway ring 4 comes into contact with the outwardly projecting piece row A of the upper case 2. With this configuration, the upper raceway ring 4 is held by the upper case 2. The end surface 5C of the outward flange portion 5A of the lower raceway ring 5 comes into contact with the inwardly projecting piece row B of the lower case 3. With this configuration, the lower raceway ring 5 is held by the lower case 3.

It is preferable that the end surface 4C of the inward flange portion 4A of the upper raceway ring 4 and the end surface 5C of the outward flange portion 5A of the lower raceway ring 5 are shear planes made through punching. With this configuration, the end surface 4C that is a high accurate shear plane is in contact with and fitted to the outwardly projecting piece row A of the upper case 2 made of the synthetic resin. The end surface 5C that is a high accurate shear plane is in contact with and fitted to the inwardly projecting piece row B of the lower case 3 made of the synthetic resin. With these configurations, the holding strength is stabilized.

<Example of Measurement of Position Relation in Strut Bearing>

Figure 5:
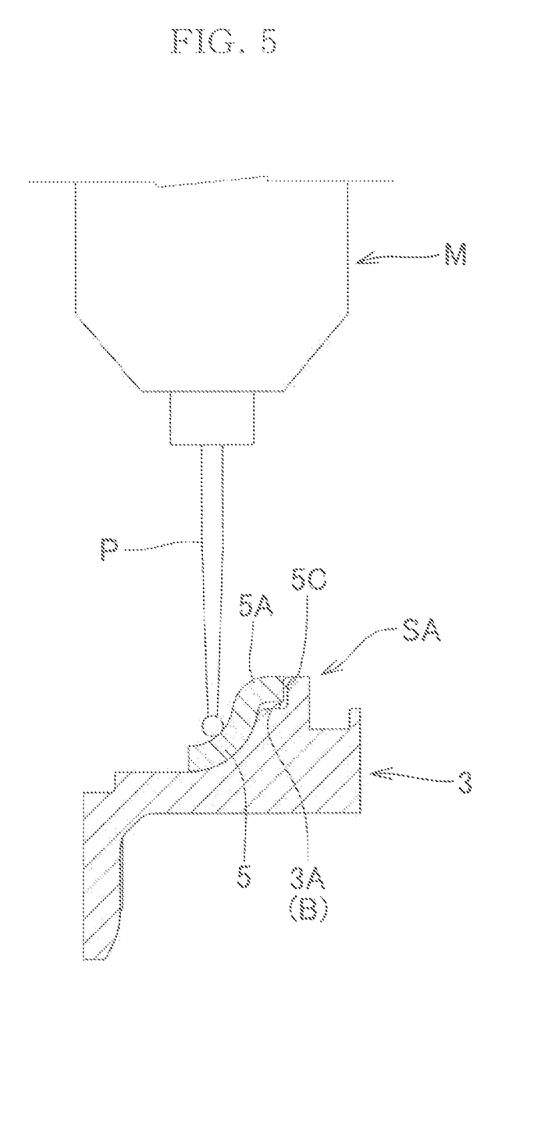
FIG. 5 is an explanatory view of an example of measurement of a position relation of the strut bearing.

The explanatory view of FIG. 5 shows an example of measurement of the position relation in the strut bearing, in which the eccentricity in a subassembly SA obtained by fitting the end surface 5C of the outward flange portion 5A of the lower raceway ring 5 to the inwardly projecting piece row B of the lower case 3, is measured by a three-dimensional measuring machine M.

The measurement is performed in such a manner that the distal end of a probe P of the three-dimensional measuring machine M is brought in contact with a measurement target surface of the subassembly SA in FIG. 5, and is moved thereon. The contact pressure of the probe P in the measurement is as heavy as several hundred grams at the maximum. The contact pressure depends on the specification of the probe P. Such measurement is performed, to thereby enable control of the eccentricity in the subassembly SA. Therefore, the quality control performance of the strut bearing can be improved.

The fitting strength between the case made of a synthetic resin and the raceway ring made of metal is set so that the case and the raceway ring are not displaced even if the measurement pressure by various measurement equipment (a probe of the three-dimensional measuring machine, a contour shape measurement terminal, and so on) is applied. A standard of the fitting strength is required to be at least the deadweight or more of the raceway ring, and is preferably twice or more of the deadweight of the raceway ring in view of the specifications of various probes of the measurement machine. Accordingly, it is only required that an interference between the case and the raceway ring is set so as to satisfy the standard of the fitting strength.

<Variation>

Figure 6A:
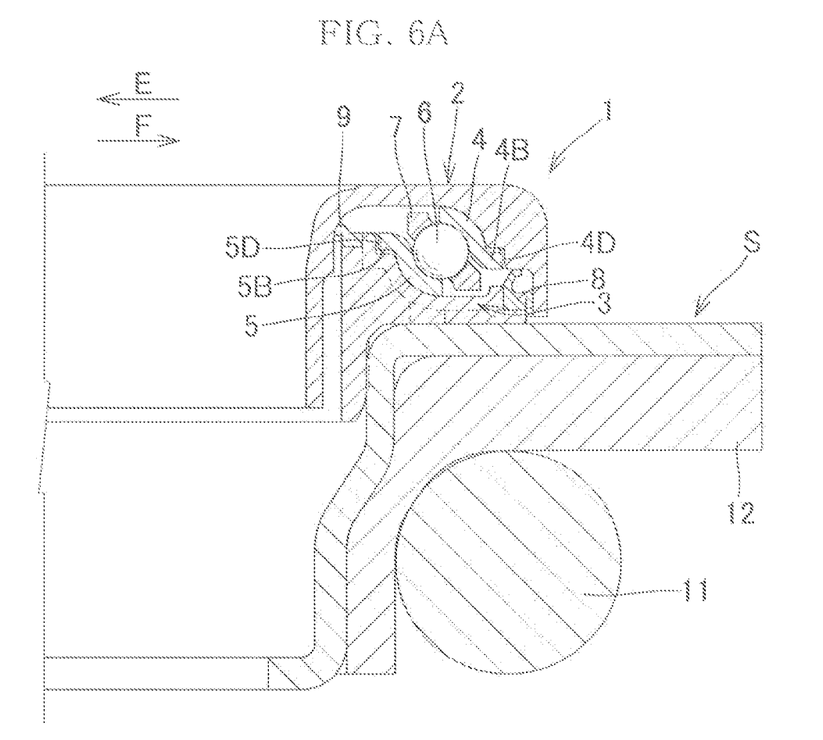
FIG. 6A is an enlarged vertical cross-sectional view of a main part of a vehicle strut suspension, showing a variation of the strut bearing according to the embodiment of the present invention.
Figure 6B:
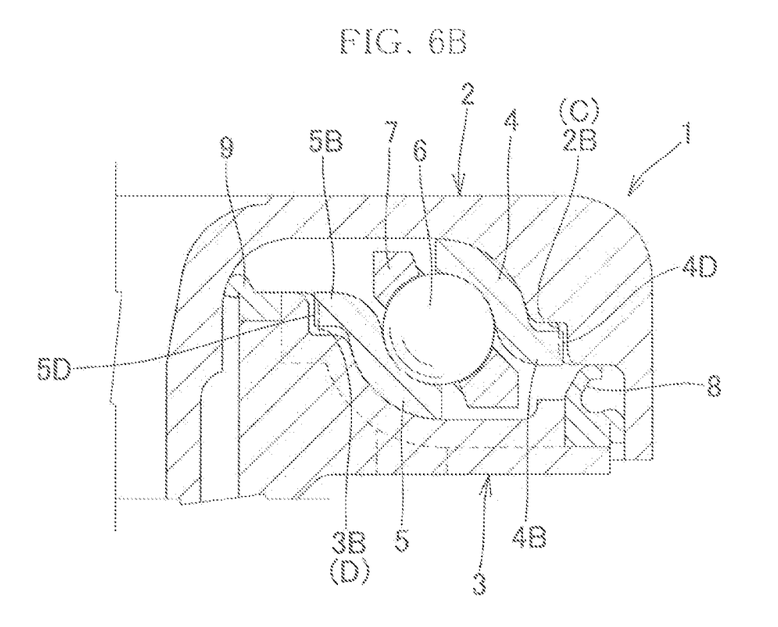
FIG. 6B is an enlarged vertical cross-sectional view of the main part of the strut bearing shown in FIG. 6A.

In a strut bearing 1 according to the variation shown in the vertical cross-sectional views of FIGS. 6A and 6B, the reference signs same as those in the strut bearing 1 shown in the vertical cross-sectional views of FIGS. 2A and 2B indicate the same or corresponding members or components.

In the variation shown in the vertical cross-sectional views of FIGS. 6A and 6B, the upper raceway ring 4 has an outward flange portion 4B projecting in the radially outward direction F, and the lower raceway ring 5 has an inward flange portion 5B projecting in the radially inward direction E.

The upper case 2 has inwardly projecting pieces 2B projecting in the radially inward direction E toward an end surface 4D of the outward flange portion 4B of the upper raceway ring 4 from a surface facing the end surface 4D. Here, the inwardly projecting pieces 2B are aligned with a space in the circumferential direction, which define an inwardly projecting piece row C.

The lower case 3 has outwardly projecting pieces 3B projecting in the radially outward direction F toward an end surface 5D of the inward flange portion 5B of the lower raceway ring 5 from a surface facing the end surface 5D. Here, the outwardly projecting pieces 3B are aligned with a space in the circumferential direction, which define an outwardly projecting piece row D.

In the strut bearing 1 according to the variation shown in the vertical cross-sectional views of FIGS. 6A and 6B, the end surface 4D of the outward flange portion 4B of the upper raceway ring 4 comes into contact with the inwardly projecting piece row C of the upper case 2. With this configuration, the upper raceway ring 4 is held by the upper case 2. The end surface 5D of the inward flange portion 5B of the lower raceway ring 5 comes into contact with the outwardly projecting piece row D of the lower case 3. With this configuration, the lower raceway ring 5 is held by the lower case 3.

It is preferable that the end surface 4D of the outward flange portion 4B of the upper raceway ring 4 and the end surface 5D of the inward flange portion 5B of the lower raceway ring 5 are shear planes made through punching. Accordingly, the end surface 4D that is a high accurate shear plane is in contact with and fitted to the inwardly projecting piece row C of the upper case 2 made of the synthetic resin, and the end surface 5D that is a high accurate shear plane is in contact with and fitted to the outwardly projecting piece row D of the lower case 3 made of the synthetic resin. Therefore, the holding strength is stabilized.

<Effects>

As mentioned above, in the strut bearing 1 according to the embodiments of the present invention, the end surface 4C of the inward flange portion 4A of the upper raceway ring 4 and the end surface 4D of the outward flange portion 4B of the upper raceway ring 4 are respectively in contact with the outwardly projecting pieces 2A (outwardly projecting piece row A) of the upper case 2 and the inwardly projecting pieces 2B (inwardly projecting piece row C) of the upper case 2, thereby allowing the upper raceway ring 4 to be held by the upper case 2. Furthermore, the end surface 5C of the outward flange portion 5A of the lower raceway ring 5 and the end surface 5D of the inward flange portion 5B of the lower raceway ring 5 are respectively in contact with the inwardly projecting pieces 3A (inwardly projecting piece row B) and the outwardly projecting pieces 3B (outwardly projecting piece row D) of the lower case 3, thereby allowing the lower raceway ring 5 to be held by the lower case 3.

In the upper case 2 and the lower case 3 which are made of the synthetic resin, fine deformation occurs due to the variation in the contraction during molding. In the upper raceway ring 4 and the lower raceway ring 5, spring back in the press working and fine deformation due to the hardening distortion are generated. The end surfaces 4C and 4D of the respective flange portions 4A and 4B of the upper raceway ring 4 are respectively fitted to the outwardly projecting pieces 2A (outwardly projecting piece row A) and the inwardly projecting pieces 2B (inwardly projecting piece row C) of the upper case 2, and the end surfaces 5C and 5D of the respective flange portions 5A and 5B of the lower raceway ring 5 are respectively fitted to the inwardly projecting pieces 3A (inwardly projecting piece row B) and the outwardly projecting pieces 3B (outwardly projecting piece row D) of the lower case 3, thereby correcting the fine distortion to improve the adhesiveness.

In the configuration of Patent Literature 1, a body portion is provided in the upper raceway ring to be held by the upper case, and a body portion is provided in the lower raceway ring to be held by the lower case. In comparison with such configuration, the strut bearing 1 according to the embodiments of the present invention can reduce the height of the upper raceway ring 4 and the lower raceway ring 5. Therefore, problems including the deterioration in machining accuracy in the upper raceway ring 4 and the lower raceway ring 5 can be resolved. In Patent Literature 2, a case made of a synthetic resin and a raceway ring made of metal are not fitted to each other. In comparison with such configuration, in the present invention, the raceway rings are fitted to the respective corresponding cases, enabling the subassembly with two components only. Under such a condition, the measurement of the position relation in the strut bearing is enabled. Therefore, the quality control performance of the strut bearing can be improved.

The above description of the embodiments are all examples, and thus the present invention is not limited thereto. Various improvements and modifications without departing from the scope of the present invention can be applied.

The invention claimed is:

1. A strut bearing comprising:
   an upper case fixed to an upper end portion of a strut in a vehicle strut suspension;
   a lower case directly or indirectly connected to a coil spring disposed on an outer side of the strut;
   an upper raceway ring being in contact with the upper case to be positioned;
   a lower raceway ring being in contact with the lower case to be positioned; and
   a rolling element rolling between the upper raceway ring and the lower raceway ring, wherein
   the upper case and the lower case are made of a synthetic resin,
   the upper raceway ring has an inward flange portion projecting in a radially inward direction,
   the lower raceway ring has an outward flange portion projecting in a radially outward direction,
   the upper case has an outwardly projecting piece projecting in the radially outward direction toward an end surface of the inward flange portion of the upper raceway ring, from a surface facing the end surface of the inward flange portion,
   the lower case has an inwardly projecting piece projecting in the radially inward direction toward an end surface of the outward flange portion of the lower raceway ring, from a surface facing the end surface of the outward flange portion, the end surface of the inward flange portion of the upper raceway ring comes into contact with the outwardly projecting piece of the upper case, to allow the upper raceway ring to be held by the upper case, and the end surface of the outward flange portion of the lower raceway ring comes into contact with the inwardly projecting piece of the lower case, to allow the lower raceway ring to be held by the lower case.

2. The strut bearing according to claim 1, wherein the end surface of the inward flange portion of the upper raceway ring and the end surface of the outward flange portion of the upper raceway ring, and the end surface of the outward flange portion of the lower raceway ring and the end surface of the inward flange portion of the lower raceway ring are shear planes made through punching.

3. A vehicle strut suspension provided with the strut bearing according to claim 1.

4. A strut bearing comprising:
an upper case fixed to an upper end portion of a strut in a vehicle strut suspension;
a lower case directly or indirectly connected to a coil spring disposed on an outer side of the strut;
an upper raceway ring being in contact with the upper case to be positioned;
a lower raceway ring being in contact with the lower case to be positioned; and
a rolling element rolling between the upper raceway ring and the lower raceway ring, wherein
the upper case and the lower case are made of a synthetic resin,
the upper raceway ring has an outward flange portion projecting in a radially outward direction,
the lower raceway ring has an inward flange portion projecting in a radially inward direction,
the upper case has an inwardly projecting piece projecting in the radially inward direction toward an end surface of the outward flange portion of the upper raceway ring from a surface facing the end surface of the outward flange portion,
the lower case has an outwardly projecting piece projecting in the radially outward direction toward an end surface of the inward flange portion of the lower raceway ring from a surface facing the end surface of the inward flange portion,
the end surface of the outward flange portion of the upper raceway ring comes into contact with the inwardly projecting piece of the upper case, to allow the upper raceway ring to be held by the upper case, and
the end surface of the inward flange portion of the lower raceway ring comes into contact with the outwardly projecting piece of the lower case, to allow the lower raceway ring to be held by the lower case.

5. The strut bearing according to claim 4, wherein the end surface of the inward flange portion of the upper raceway ring and the end surface of the outward flange portion of the upper raceway ring, and the end surface of the outward flange portion of the lower raceway ring and the end surface of the inward flange portion of the lower raceway ring are shear planes made through punching.

6. A vehicle strut suspension provided with the strut bearing according to claim 4.

* * * * *